Nov. 10, 1970 MASAO TAKAGI 3,540,055

FREQUENCY DIVERSITY RADIO RECEIVER HAVING AUTOMATIC MAINTENANCE OF ZERO FREQUENCY DIFFERENCE BETWEEN TWO IF SIGNALS

Filed Oct. 20, 1967 2 Sheets-Sheet 1

INVENTOR.
Masao Takagi
BY
Marn & Jangarathis
ATTORNEYS

INVENTOR.
Masao Takagi
BY
Marn & Jangarathis
ATTORNEYS

United States Patent Office 3,540,055
Patented Nov. 10, 1970

3,540,055

FREQUENCY DIVERSITY RADIO RECEIVER HAVING AUTOMATIC MAINTENANCE OF ZERO FREQUENCY DIFFERENCE BETWEEN TWO IF SIGNALS

Masao Takagi, Tokyo, Japan, assignor to Nippon Electric Company, Limited, Tokyo, Japan
Filed Oct. 20, 1967, Ser. No. 676,890
Claims priority, application Japan, Oct. 22, 1966, 41/69,539
Int. Cl. H04b 7/12
U.S. Cl. 343—205 6 Claims

ABSTRACT OF THE DISCLOSURE

A dual frequency diversity radio receiver, including two oscillators, one providing a fixed frequency signal and the other a variable frequency signal, for deriving first and second components having different frequencies for conversion into third and fourth components having the same predetermined intermediate frequency; and a phase detector responsive to a phase difference between the third and fourth components for providing a voltage varying in magnitude in correspondence with such phase difference to activate the variable frequency oscillator to simultaneously vary the first and second component frequencies in opposite senses to maintain zero phase difference between the third and fourth component.

This invention relates to a frequency diversity radio receiver for two microwave signal modulated carrier waves having carrier waves of different frequencies and being either phase or frequency modulated, and, more specifically, to such receiver embodying an improved arrangement for automatically maintaining zero frequency difference between two intermediate frequency signals derived from the two received signal modulated carrier waves.

It was known heretofore that conventional frequency diversity radio receivers required a high degree of frequency stability for the local oscillators in a single heterodyne radio receiver. Some conventional radio receiver attempted to maintain frequency stabilty therein by operating a first local oscilaltor to supply a signal of fixed frequency to all routes while routes connected to a second local oscilaltor and receiving a signal of variable frequency therefrom were separately operated, whereby the phase of the variable frequency second local signal is controlled to align and combine the phases of the signals in those routes. It was thus found in some conventional radio receivers of the above type that the reduction of relative frequency deviations of local signals was achieved only by considerably increasing the frequency stability of the local signal oscillators.

The present invention concerns an improved arrangement for continuously and automatically controlling the frequencies of local signals in opposite directions at the same time as utilized in the derivation of intermediate frequency signals in a frequency diversity radio receiver.

A principal object of the present invention is to improve the operation of a frequency diversity radio receiver.

Another object is to improve the frequency stability of local signals in a frequency diversity radio receiver.

A further object is to maintain continuously zero frequency difference between two intermediate frequency signals in a frequency diversity radio receiver.

An additional object is to improve frequency stability by automatically varying the frequencies of two local signals in opposite directions at the same time in a frequency diversity radio receiver.

Still another object is to derive two intermediate frequency signals from two local signals varying in frequencies in opposite directions at the same time for continuously maintaining zero frequency difference between the two intermediate frequency signals.

A still further object is to vary the frequency of one of two local signals for continuously maintaining phase coincidence between two intermediate frequency signals in a frequency diversity radio receiver.

Still an additional object is to employ phase detection between two intermediate frequency signals for continuously maintaining zero frequency difference therebetween in a frequency diversity radio receiver.

Another object is to vary automatically the frequency of one of two local signals for continuously maintaining zero frequency difference between two intermediate frequency signals derived from the two local signals.

In association with a frequency diversity radio receiver including an antenna for receiving two carrier waves $f_1$ and $f_1+f_D$ suitably modulated by the same signal, two filters for separating the received signals into a first signal modulated carrier wave $f_1$ and a second signal modulated carrier wave $f_1+f_D$, and a signal combiner for simultaneously combining two intermediate frequency signals $f_i$ derived from the two received signal modulated carrier waves $f_1$ and $f_1+f_D$, a specific embodiment of the present invention comprises an arrangement for continuously maintaining zero frequency difference between the two intermediate frequency signals $f_i$ at the signal combiner, including a first frequency converter for translating a first local signal of fixed frequency supplied by a first oscillator and a second local signal of variable frequency supplied by a second oscillator into lower and upper side-band components $f_1+f_i$ and $f_1+f_D+f_i$, respectively, variable in opposite directions at the same time, a second frequency converter for deriving one of the two intermediate frequency signals $f_i$ from the separated first signal wave $f_1$ and lower side-band component $f_1+f_i$, a third frequency converter for deriving a second of the two intermediate frequency signals $f_i$ from the separated second signal wave $f_1+f_D$ and upper side-band component $f_1+f_D+f_i$, and a phase detector responsive to a phase difference between the two intermediate frequency signals $f_i$ for providing a voltage of varying magnitude representing changing frequency difference between the two intermediate frequency signals $f_i$ to activate the second oscillator to change continuously the frequencies of the lower and upper side-bands $f_1+f_i$ and $f_1+f_D$ and $f_i$ respectively, in opposite directions at the same time as relative frequency deviations continuously occur between the last-mentioned two intermediate frequency signals $f_i$.

A feature of the invention resides in the use of two lower and upper side-band signal components variable in frequencies in opposite directions at the same time for deriving two intermediate frequency signals in a frequency diversity radio receiver. Another feature relates to a continuous variation of the frequencies of two lower and upper side-band signal components in opposite directions at the same time for continuously maintaining zero frequency difference between two intermediate frequency signals derived from the latter components in a frequency diversity radio receiver. Still another feature involves the use of two oscillators, one supplying a signal of fixed frequency and the other a signal of variable frequency, for providing lower and upper side-band components from which two intermediate frequency signals are derived in a frequency diversity radio receiver. An additional feature includes a phase detector providing a votlage varying in magnitude and representing a changing frequency difference between two intermediate frequency signals for activating an oscillator to change the frequency of its output signal and thereby change the frequencies of lower and upper side-band signal components in opposite directions at the same time to maintain continuously zero difference frequency between the latter intermediate frequency signals in a frequency diversity radio receiver. Still another feature relates to the use of two local oscillators in a circuit common to two different routes in a double frequency diversity radio receiver for providing signals from which two intermediate frequency signals are derived for use in the respective latter routes.

The invention is readily understood from the following description taken together with the accompanying drawings in which.

Figure 1:
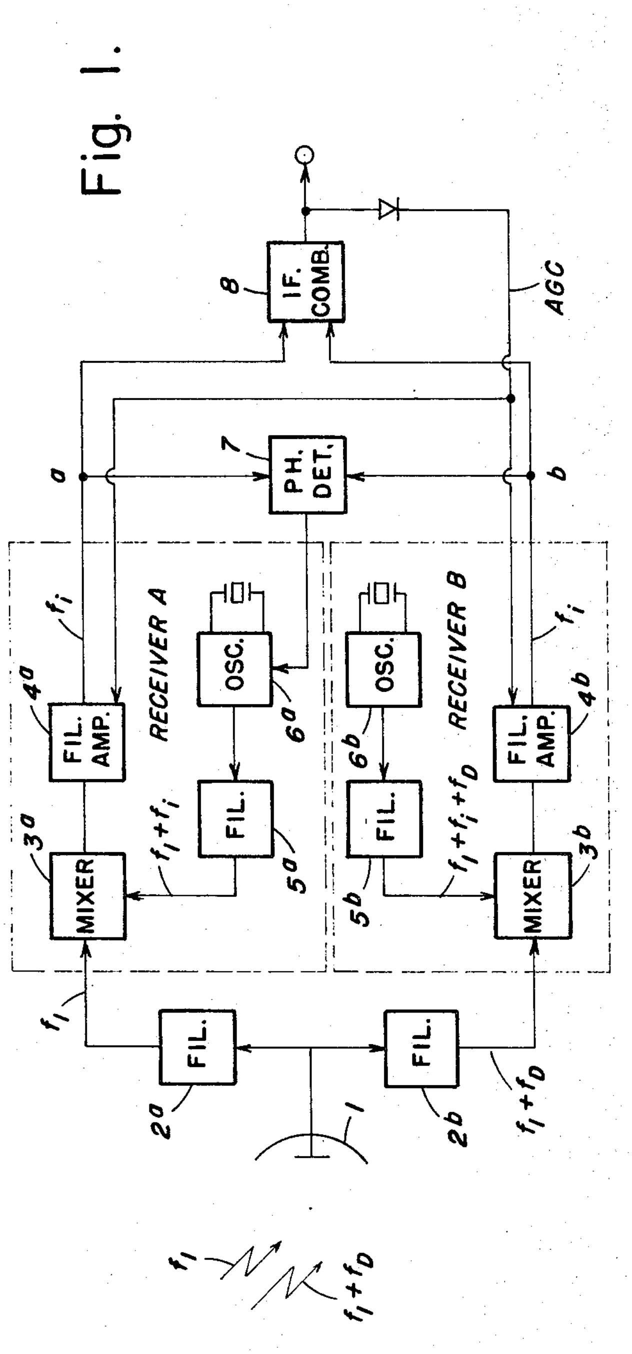
FIG. 1 is a box diagram of a dual frequency diversity radio receiver in the prior art.

FIG. 1 shows receivers A and B connected through frequency dividers or filters 2*a* and 2*b*, respectively, to an antenna 1 which is simultaneously receiving two signal modulated carrier waves $f_1$ and $f_1+f_D$ modulated in either frequency or phase by the same information signals in a conventional manner. Filter 2*a* separates the signal modulated carrier wave $f_1$ received from the antenna for application to signal mixer 3*a* which is simultaneously receiving a local signal of frequency $f_1+f_i$ via filter 5*a* and crystal oscillator 6*a* variable in frequency. From the components in the output of the mixer, filter-amplifier 4*a* selects and amplifies a first intermediate frequency signal $f_1$ which is applied as one input to IF signal combiner 8. Filter 2*b* separates the signal modulated carrier wave $f_1+f_D$ received from the antenna for application to signal mixer 3*b* which is simultaneously receiving a local signal of frequency $f_1+f_D+f_i$ via filter 5*b* and crystal oscillator 6*b* fixed in frequency. From the components in the output of the latter mixer, filter-amplifier 4*b* selects and amplifies a second intermediate frequency signal $f_i$ which is applied as a second input to the IF signal combiner.

It is necessary in FIG. 1 to provide the two intermediate frequency signals $f_i$ with the same phase at the input of the signal combiner in order to obtain optimum quality in combined intermediate frequency signals in the output of the signal combiner. The same phase of the two input intermediate frequency signals is achieved by sampling portions thereof at points *a* and *b* in FIG. 1 via phase detector 7 whose output voltage is applied to oscillator 6*a*. This voltage varies the frequency $f_1+f_i$ of the signal of oscillator 6*a* in correspondence with changes in the magnitude thereof to provide the two intermediate frequency signals $f_i$ with the same phase, in the well-known manner. In this instance, the quantity to be controlled includes the relative frequency deviation between the received signal modulated carrier waves $f_1$ and $f_1+f_D$ and the relative frequency deviation between the frequencies $f_1+f_i$ and $f_1+f_i+f_D$ of the local signals at both receivers A and B. For example, in case of a signal in a 2GC frequency band in an over-the-horizon circuit, the relative frequency deviation of the received waves may amount to several hundred cycles, while the relative frequency deviation of the frequencies $f_1+f_i$ and $f_1+f_D+f_i$ of the local signals may be from several to several ten kilocycles. Although the above frequency control system is primarily intended for controlling only the relative deviation of the received signal waves, it must control even the relative deviation of the local signal frequencies at both receivers A and B. This is disadvantageous because it complicates the construction of the frequency control circuit. To reduce the relative deviation of the frequencies of the local signals, the stability of the frequencies of both local signals provided by the local oscillators must be considerably increased.

Figure 2:
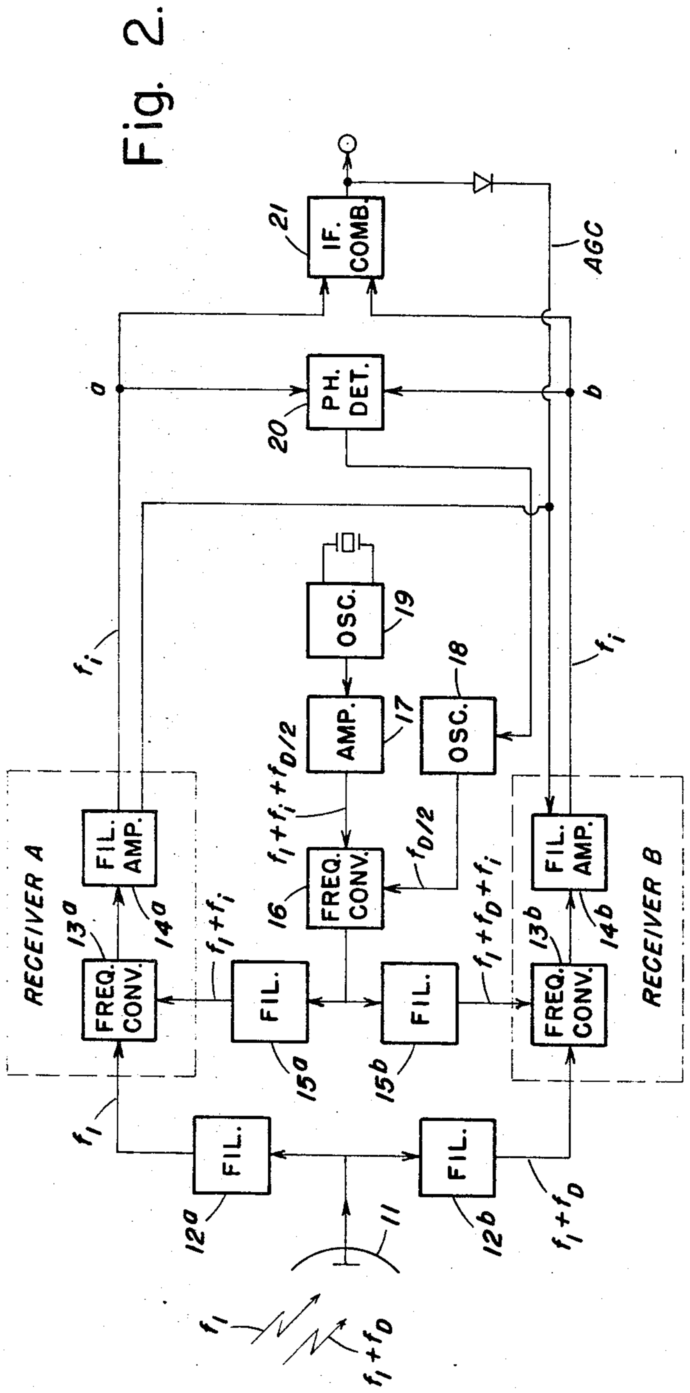
FIG. 2 is a box diagram of a dual frequency diversity radio receiver embodying a specific embodiment of the present invention.

The specific embodiment of the invention as embodied in FIG. 2 which includes receivers A and B is now explained. Signal modulated carrier waves $f_1$ and $f_1+f_D$ received via antenna 11 are divided or separated by filter-dividers 12*a* and 12*b*, respectively, into signal modulated carrier waves $f_1$ and $f_1+f_D$. Received signal modulated carrier wave $f_1$ is mixed in frequency converted 13*a* together with a first receiving local signal of frequency $f_1+f_i$ supplied via narrow band filter 15*a* and frequency converter 16. From the components in the output of converter 13*a*, filter-amplifier 14*a* selects and amplifies one signal modulated intermediate frequency carrier wave $f_i$ which is applied as one input to intermediate frequency signal combiner 21. Similarly, received signal modulated carrier wave $f_1+f_D$ is mixed in frequency converter 13*b* together with a second receiving local signal of frequency $f_1+f_i+f_D$ supplied via narrow band filter 15*b* and frequency converter 16. From the components in the output of converter 13*b*, filter-amplifier 14*b* selects and amplifies another signal modulated intermediate frequency carrier wave $f_i$ which is applied as a second input to the intermediate frequency signal combiner 21.

Local signals of frequencies $f_1+f_i$ and $f_1+f_i+f_D$ applied to frequency converters 13*a* and 13*b*, respectively, as above mentioned are generated in the following manner in accordance with the specific embodiment of the invention. A signal having a frequency $f_1+f_i+f_{D/2}$ generated in crystal oscillator 19 and amplified in amplifier 17 is applied to frequency converter 16. At the same time, a signal having a frequency $f_{D/2}$ generated in VCO oscillator 18 is applied to frequency converter 16. These two local signals mixed in the latter converter provide first double side-band components which comprise a lower side-band component $f_1+f_i$ $[(f_1+f_i+f_{D/2})-f_{D/2}$ or $f_1+f_i]$ and an upper side-band component $f_1+f_i+f_D$ $[f_1+f_i+f_{D/2})+f_{D/2}$ or $f_1+f_i+f_D]$. These lower and upper side-band components, available among other components, in the output of frequency converter 16 are selected by filters 15*a* and 15*b* for use in receivers A and B as previously mentioned.

Optimum quality in the two intermediate frequency signals $f_i$ combined in signal combiner 21 and appearing in the output thereof is achieved by maintaining the latter two signals $f_i$ in the same phase at the input of the latter combiner in a manner that is now explained. Portions of the two intermediate frequency signals $f_i$ taken from points *a* and *b* in FIG. 2 are supplied to a phase detector 20 which provides an output voltage varying magnitude in correspondence with the degree of phase changes or frequency deviating between the latter two intermediate frequency signal portions $f_i$. This varying magnitude voltage applied to local oscillator 18 serves to vary the frequency $f_{D/2}$ of the output signal thereof in correspondence with the varying magnitude of the latter voltage.

Figure 3:
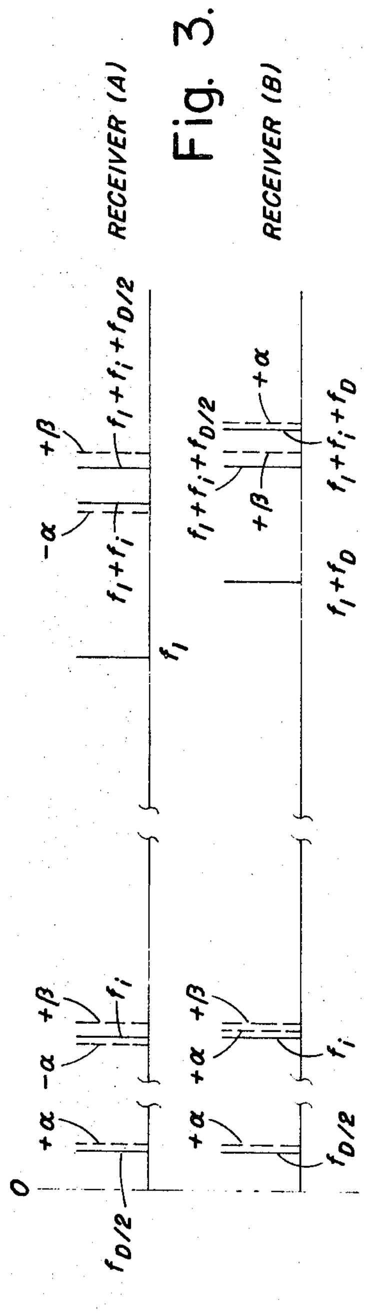
FIG. 3 is a family of indicators illustrating signal frequency relationships attainable in FIG. 2.

As described above, assuming the local signals of frequencies $f_1+f_i$ and $f_1+f_i+f_D$ for use in receivers A and B, respectively, are obtained in the relationship shown in FIG. 3, then a variation $\alpha$ in the frequency $f_{D/2}$ of the local signal of oscillator 18 can cause a variation of $-\alpha$ in the frequency of the lower side-band component, viz., $[(f_1+f_i+f_{D/2})-(f_{D/2}+f_\alpha)]=f_1+f_i-f_\alpha$, and a variation of $+_\alpha$ in the frequency of the upper side-band component, viz., $[(f_1+f_i+f_{D/2})+(f_{D/2}+f_\alpha)]=f_1+f_i+f_\alpha$. Thus, it is apparent that variations of the frequencies of the receiving lower and upper side-band components take place in opposite directions at the same time.

When a frequency variation $+\beta$ occurs in the frequency $f_1+f_1+f_{D/2}$ of the signal of oscillator 19, the frequency $f_1+f_i$ of the lower side-band component is also increased by the frequency $+\beta$ $(f_1+f_i+f_\beta)$ and the frequency $f_1+f_i+f_D$ of the upper side-band component is also increased by the frequency $+\beta$ $(f_1+f_i+f_D+f_\beta)$. In general, the effect of variations in the frequency $f_1+f_i+f_{D/2}$ of the signal produced by local oscillator 19 common to both receivers A and B, which effect will appear as the relative difference between the intermediate frequency signals $f_1$ at points *a* and *b*, may be ignored because the frequency $f_{D/2}$ of the signal produced by VCO oscillator 18 can bet set at a numerical value considerably lower than that of the signal frequency $f_1+f_I+f_{D/2}$. As illustrated in FIG. 3, when the common local signal frequency $f_1+f_I+f_{D/2}$ changes by a frequency $+f_\beta$, the lower side-band component has the frequency $f_1+f_I+f_\beta$ and the upper side-band component has the frequency $f_1+f_I+f_D+F_\beta$. Since the lower and upper side-band components of frequencies $f_1+f_I+f_\beta$ and $f_1+f_I+f_D+f_\beta$ are converted via frequency converters 13*a* and 13*b* into two intermediate frequency signals $f_I+f_\beta$, the relative difference between the frequencies of the points *a* and *b* in FIG. 2 is reduced to zero. This also occurs when the frequency $f_1+f_I+f_{D/2}$ of the signal of oscillator 19 changes by a frequency $-\beta$. Therefore, a specially high degree of stability is not required for the frequency of common oscillator 19.

Because, as hereinbefore described, both lower and upper sideband frequencies $f_1+f_I$ and $f_1+f_I+f_D$, respectively, can be continuously and automatically changed in opposite directions at the same time by virtue of the continuous changes in the frequency of the voltage derived in the phase detector 20 in FIG. 2 for continuously controlling the freqquency $f_{D/2}$ of the signal of VCO oscillator 18, the received signal modulated carrier waves $f_1$ and $f_1+f_D$ can be so properly controlled that the relative frequency difference therebetween is continuously kept at zero at points *a* and *b* of both intermediate frequency signals $f_I$. Thus, as the circuit of FIG. 2 is controlled to keep the phase difference between the two intermediate frequency signals $f_I$ at points *a* and *b* at a continuously constant value, the two latter signals $f_I$ provided in receivers A and B are readily combined for optimum quality in the output of signal combiner 21 for frequency diversity reception.

While the invention has been described with reference to a dual frequency diversity radio receiver for the purpose of enabling a better understanding of the principles thereof, it is obvious that the invention is also advantageously applicable to a quadruple frequency diversity radio receiver.

As the invention provides a signal superheterodyne circuit having a local oscillator common to receivers A and B in a multiplex frequency diversity radio receiver, its thus dispenses with the need for local oscillators of extraordinarily high frequency stability and at the same time precludes the occurence of adverse effects in the relative difference between the frequencies of the signals of the local oscillators 18 and 19 in FIG. 2.

It is understood that the invention herein is described in specific respects for the purpose of this description. It is also understood that such respects are merely illustrative of the application of the principles of the invention. Numerous other arrangements may be devised by those skilled in the art without departing from the spirit and scope of the invention.

What is claimed is:

1. A dual frequency diversity radio receiver, comprising:

common antenna means simultaneously receiving first and second signal modulated carrier waves having different frequencies;

first frequency selective means separating said received first and second carrier waves into first and second signal branches, respectively;

oscillator means including an oscillator producing an output signal having a fixed predetermined frequency for generating signal components variable in frequencies and comprising a first component having a frequency equal to the sum of the frequency of said first carrier wave and a predetermined intermediate frequency and a second component having a frequency equal to the sum of the frequency of said second carrier wave and said predetermined intermediate frequency; said last-mentioned means being voltage responsive for simultaneously varying said first and second component frequencies in opposite senses;

second frequency selective means converting said first carrier wave in said first branch and said first component into a third component having said predetermined intermediate frequency in said first branch;

third frequency selective means converting said second carrier wave in said second branch and said second component into a fourth component having said predetermined intermediate frequency in said second branch;

means combining said third and fourth components in said respective first and second branches for providing a composite output component having said predetermined intermediate frequency;

and frequency responsive means detecting a frequency difference between said third and fourth components for producing an error voltage varying in magnitude in correspondence with said last-mentioned frequency difference to activate said oscillator means to simultaneously vary said first and second component frequencies in said opposite senses to maintain a zero frequency difference between said last-mentioned third and fourth components.

2. The receiver according to claim 1 in which said oscillator means includes a second oscillator producing an output signal variable in frequency relative to another predetermined frequency for enabling the generation of said first and second components.

3. The receiver according to claim 2 in which said oscillator means includes means converting said first-mentioned oscillator fixed frequency signal and said second oscillator variable frequency output signal into said first and second components.

4. The receiver according to claim 3 in which said frequency selective means includes a phase detector responsive to a phase difference between said third and fourth components for producing said error voltage varying in magnitude in correspondence with said last-mentioned phase difference to activate said second oscillator to vary the output signal frequency thereof so as to simultaneously vary said first and second component frequencies in said opposite senses to maintain zero phase difference between said last-mentioned third and fourth components.

5. A dual frequency diversity radio receiver, comprising:

common antenna means simultaneously receiving first and second signal modulated carrier waves having different frequencies;

first frequency selective means separating said received first and second carrier waves into first and second signal branches, respectively;

oscillator means including:

a first oscillator producing an output signal having a fixed predetermined frequency;

and a second oscillator producing an output signal variable in frequency relative to another predetermined frequency; said last-mentioned means generating signal components variable in frequencies and comprising a first component having a frequency equal to the sum of the frequency of said first carrier wave and a predetermined intermediate frequency and a second component having a frequency equal to the sum of the frequency of said second carrier wave and said predetermined intermediate frequency; said last-mentioned means being voltage responsive for simultaneously varying said first and second component frequencies in opposite senses;

second frequency selective means converting said first carrier wave in said first branch and said first component into a third component having said predetermined intermediate frequency in said first branch;

third frequency selective means converting said second wave in said second branch and said second component into a fourth component having said predetermined intermediate frequency in said second branch;

means combining said third and fourth components in said respective first and second branches for providing a composite output component having said predetermined intermediate frequency;

and a phase detector responsive to a phase difference between said first and second components for producing an error voltage varying in magnitude in correspondence with last-mentioned phase difference to activate said second oscillator to simultaneously vary said first and second component frequencies in said opposite senses to maintain zero phase difference between said last-mentioned third and fourth components.

6. A dual frequency diversity radio receiver, comprising:

common antenna means simultaneously receiving first and second signal modulated carrier waves having different frequencies;

first frequency selective means separating said received first and second carrier waves into first and second signal branches, respectively;

oscillator means generating signal components variable in frequencies and comprising a first component having a frequency equal to the sum of the frequency of said first carrier wave frequency and a predetermined intermediate frequency and a second component having a frequency equal to the sum of the frequency of said second carrier wave and said predetermined intermediate frequency, comprising:

a first oscillator producing an output signal having a fixed second predetermined frequency for enabling the generation of said first and second components;

a second oscillator voltage responsive for producing an output signal variable in frequency relative to a third predetermined frequency to enable the generation of said first and second components;

and means converting said first oscillator fixed frequency output signal and said second oscillator variable frequency output signal into said first and second components;

second frequency selective means converting said first carrier wave in said first branch and said first component into a third component having said predetermined intermediate frequency in said first branch;

third frequency selective means converting said second carrier wave in said second branch and said second component into a fourth component having said predetermined intermediate frequency in said second branch;

means combining said third and fourth components in said respective first and second branches for providing a composite output component having said predetermined intermediate frequency;

and phase detecting means responsive to a phase difference between said third and fourth components for producing an error voltage varying in magnitude in correspondence with said last-mentioned phase difference to activate said second oscillator to vary said output signal frequency thereof so as to simultaneously vary said first and second component frequencies in opposite senses to maintain zero phase difference between said last-mentioned third and fourth components.

References Cited

UNITED STATES PATENTS

| | | | |
|---|---|---|---|
| 2,955,199 | 10/1960 | Mindes | 343—206 X |
| 2,302,852 | 11/1942 | Goddard | 325—307 X |
| 3,383,599 | 5/1968 | Miyagi | 325—305 |
| 3,390,335 | 6/1968 | Miyagi | 325—56 |
| 3,444,471 | 5/1969 | French | 325—305 X |

ROBERT L. GRIFFIN, Primary Examiner

B. V. SAFOUREK, Assistant Examiner

U.S. Cl. X.R.

325—305, 307